(12) United States Patent
Chan et al.

(10) Patent No.: US 6,965,893 B1
(45) Date of Patent: Nov. 15, 2005

(54) TECHNIQUES FOR GRANTING SHARED LOCKS MORE EFFICIENTLY

(75) Inventors: Wilson Wai Shun Chan, San Maeto, CA (US); Michael Zoll, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1101 days.

(21) Appl. No.: 09/746,580

(22) Filed: Dec. 20, 2000

(51) Int. Cl.$^7$ .............................................. G06F 17/30
(52) U.S. Cl. ........................ 707/8; 707/10; 707/201; 710/200; 711/150; 711/151; 711/152
(58) Field of Search .............................. 707/8, 10, 201; 710/200; 711/150–152

(56) References Cited

U.S. PATENT DOCUMENTS

| | | | |
|---|---|---|---|
| 5,285,528 A | | 2/1994 | Hart |
| 5,410,697 A | * | 4/1995 | Baird et al. .................. 711/152 |
| 5,454,108 A | | 9/1995 | Devarakonda et al. |
| 5,551,046 A | * | 8/1996 | Mohan et al. .................. 707/8 |
| 5,596,754 A | * | 1/1997 | Lomet .......................... 710/200 |
| 5,682,537 A | * | 10/1997 | Davies et al. ............... 710/200 |
| 6,353,836 B1 | | 3/2002 | Bamford et al. |
| 6,668,295 B1 | | 12/2003 | Chan |
| 2004/0225742 A1 | | 11/2004 | Loaiza et al. |

OTHER PUBLICATIONS

Rahm, Erhard, "Concurrency and Coherency Control in Database Sharing Systems", Technical Report ZRI, Dec. 1991, Revised: Mar. 1993, pp. 1-62.*
Lory D. Molesky et al., "Database Locking Protocols for Large-Scale Cache-Coherent Shared Memory Multiprocessors: Design, Implementation and Performance," Jun. 6, 1995, pp. 1-24.

(Continued)

*Primary Examiner*—Khanh Pham
(74) *Attorney, Agent, or Firm*—Hickman Palermo Truong & Becker LLP

(57) ABSTRACT

Techniques are disclosed for managing resources that are accessible to a plurality of entities. In one embodiment, shared locks on a resource are granted more efficiently by maintaining data that is local to (e.g. on the same node as) each entity to indicate whether an exclusive lock has been granted on the resource to any entity of the plurality of entities. Data that (15) is maintained local to an entity, and that (16) indicates whether any entity has an exclusive lock on a particular resource is referred to herein as a "local exclusive lock flag" for that particular resource. When an entity of the plurality of entities seeks to acquire a shared lock for a particular resource, that entity checks the local exclusive lock flag for that particular resource. If the local exclusive lock flag indicates that no entity holds an exclusive lock on the resource, then the entity seeking the shared lock acquires the shared lock without first receiving a lock grant from the resource manager that manages the resource. In many cases, the resource manager that manages the resource is remotely located relative to the entity that desires the shared lock. Because the local exclusive lock flag is local, the act of checking it does not incur the overhead associated with communicating with a remotely located resource manager. Thus, obtaining a shared lock based on the state of a local exclusive lock flag significantly increases the efficiency of managing access to the resource, particularly for resources for which entities do not frequently require exclusive access.

26 Claims, 7 Drawing Sheets

OTHER PUBLICATIONS

Lory D. Molesky et al., "Efficient Locking for Shared Memory Database Systems," Mar. 1994, 28 pages.

Written Opionion from PCT Patent Application No. PCT/US02/06981 dated Oct. 3, 2004(8 pgs).

Current Claims in PCT Patent Application No. PCT/US02/06981 (8 pgs.).

Office Action from Canadian Patent Application No. 2,448,050 dated Oct. 1, 2004 (2 pgs).

Current Claims in Canadian Patent Application No. 2,448,050 (48 pgs).

Office Action from European Patent Application No. 01968979.3-2212, dated Aug. 6, 2004 (3 pgs.).

Current Claims in European Patent Application No. 01968979.3-2212 (3 pgs.).

* cited by examiner

TECHNIQUES FOR GRANTING SHARED LOCKS MORE EFFICIENTLY

FIELD OF THE INVENTION

The present invention relates generally to managing resources and, more specifically, to granting shared locks more efficiently on a resource managed by a cluster lock manager.

BACKGROUND OF THE INVENTION

During execution of computer programs, computers use resources, such as memory, modems, printers, databases, etc. Many of these resources are only used periodically by any given computer program. To take full advantage of resources, computer networks have been developed in which processes running on many computer devices or "nodes" can share resources. Consequently, instead of having to purchase one printer for every computer, users may purchase a single printer for use by many computers that are connected to a network. Processes on each computer on the network access the printer only when the processes seek to use the printer.

Even though resources may be shared, many resources may not be used by more than one process at a given time. For example, most printers are unable to print more than one document at a time. Other resources, such as data blocks of a storage medium or tables stored on a storage medium, may be concurrently accessed in some ways (e.g. read) by multiple processes, but accessed in other ways (e.g. written to) by only one process at a time. As a result, mechanisms have been developed to control access to resources.

One such mechanism uses locks. A lock is a data structure that indicates that a particular process has been granted certain rights with respect to a resource. There are many types of locks, some of which may be shared by many processes, while other types prevent any other locks to be granted on the same resource. FIG. 1A illustrates a hierarchy of lock modes that may be used to govern access to a table in a database.

At the lowest level in the hierarchy is a NULL mode lock 160. Ownership of a NULL mode lock on a table grants a process no permission to access the table in any manner. Ownership of a concurrent read lock 158 grants a process permission to read the table, but does not guarantee that other processes are not concurrently writing to the table. Ownership of a protected read lock 154 grants a process permission to read the table and guarantees that no other process is concurrently writing to the table. Ownership of a concurrent write lock 156 grants a process permission to write to the table, but does not guarantee that another process is not also writing to the table. Ownership of a protected write lock 152 grants a process permission to write to the table and guarantees that another process is not also writing to the table. Ownership of an exclusive mode lock 150 grants a process permission to perform any operation on a table, and guarantees that no other process is performing any operation on the table.

Due to the various permissions and guarantees associated with these locks, certain lock combinations are not allowed. For example, if a process owns an exclusive mode lock on a resource, then no other process can be granted any lock other than a NULL mode lock. If a process owns a protected write lock, then no other process may be granted an exclusive mode lock, a protected write lock, a protected read lock or a concurrent write lock. If a process owns a protected read lock, then no other process may be granted an exclusive mode lock, a protected write lock or a concurrent write lock. If a process owns a concurrent write lock, then no other process may be granted an exclusive mode lock, a protected write lock, or a protected read lock. If a process owns a concurrent read lock, then no other process may be granted an exclusive mode lock, etc.

A lock that may be held by more than one process at a time is referred to as a shared lock. For example, concurrent read locks are shared locks because two processes can hold concurrent read locks on the same resource at the same time. In one arrangement, before a process can perform an operation on a resource, the process is required to obtain a lock that grants to the process the right to perform the desired operation on the resource. To obtain a lock, a process transmits a request for the lock to a lock manager, which is a process responsible for managing locks to resources, such as, granting, queuing, and keeping track of locks, etc. A lock manager usually manages locks for a group of processes. In one arrangement, a process is a program executing a particular task.

In a multi-node network system, various processes being run in a group of nodes (a "node group") may be assigned to a lock manager that resides in one node (the "master node") of the node group. If any process in a node of a node group seeks to access a resource, the process sends a lock request to the lock manager on the master node of assigned to the node group. Because the lock manager manages locks for all nodes in the node group, the lock manager may reside in a node that is remote from the node executing the process that is requesting the lock (the "requesting node").

In one approach, if a requesting node is remote from the master node, then the requesting node is required to send a message to the remote master node. The lock manager then sends a response message to the requesting node to notify that node about whether a lock may be granted. Two messages are required to complete a lock request transaction in this approach: one from the requesting node to the master node and one from the master node to the requesting node. Further, even if the lock manager can grant the lock to the requesting node without any conflict, the requesting node has to wait for the response message from the lock manager before being able to obtain the requested lock.

When none of the nodes in the node group is holding an exclusive lock, and the requesting node is seeking a shared lock, the lock manager can grant the lock to the requesting node because there are no conflicts. However, the requesting node must still wait for the response from the master node before accessing the resource that corresponds to the lock. Waiting for the response from the lock manager under these conditions increases latencies and causes a delay in request processing.

Based on the foregoing discussion, it is clearly desirable to provide techniques for improving the efficiency of lock management, particularly in situations where a node in a node group seeks to obtain a shared lock.

SUMMARY OF THE INVENTION

Techniques are disclosed for managing resources that are accessible to a plurality of entities. In one embodiment, shared locks on a resource are granted more efficiently by maintaining data that is local to (e.g. on the same node as) each entity to indicate whether an exclusive lock has been granted on the resource to any entity of the plurality of entities. Data that (1) is maintained local to an entity, and that (2) indicates whether any entity has an exclusive lock on a particular resource is referred to herein as a "local exclusive lock flag" for that particular resource.

When an entity of the plurality of entities seeks to acquire a shared lock for a particular resource, that entity checks the local exclusive lock flag for that particular resource. If the local exclusive lock flag indicates that no entity holds an exclusive lock on the resource, then the entity seeking the shared lock acquires the shared lock without first receiving a lock grant from the resource manager that manages the resource. In many cases, the resource manager that manages the resource is remotely located relative to the entity that desires the shared lock. Because the local exclusive lock flag is local, the act of checking it does not incur the overhead associated with communicating with a remotely located resource manager. Thus, obtaining a shared lock based on the state of a local exclusive lock flag significantly increases the efficiency of managing access to the resource, particularly for resources for which entities do not frequently require exclusive access.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
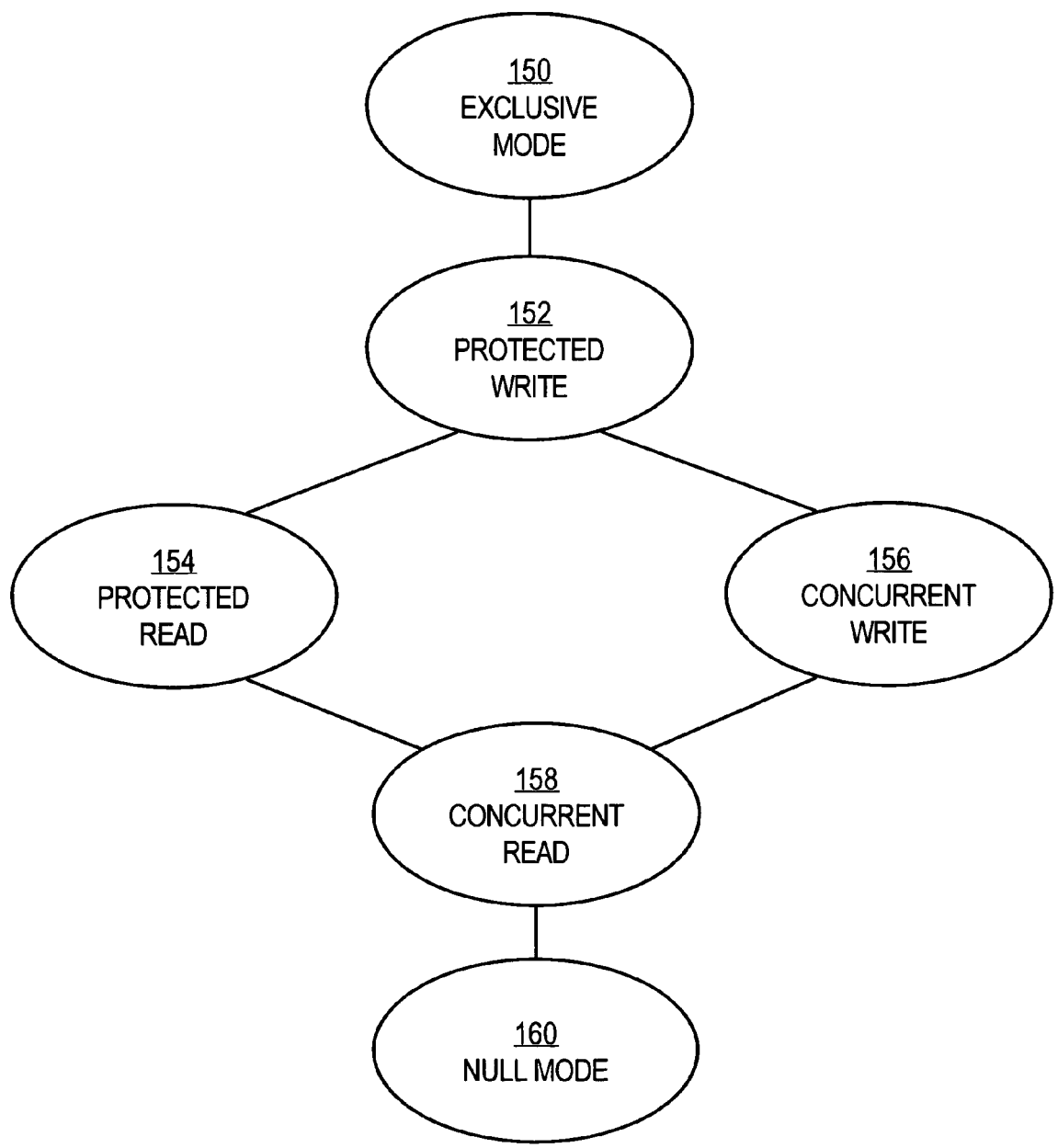
FIG. 1 illustrates a hierarchy of lock modes that may be used to govern access to a table in a database.

Techniques are disclosed for managing resources that are accessible to a plurality of entities. In one embodiment, shared locks on the resources are granted more efficiently by maintaining local exclusive lock flags to indicate whether an exclusive lock has been granted to any entity of the plurality of entities.

Functional Overview

When an entity of a plurality of entities seeks to acquire a shared lock for a particular resource, that entity checks the local exclusive lock flag for that particular resource. Because the local exclusive lock flag is local to the entity, the act of checking it does not incur the overhead associated with communicating with a remote resource manager.

If the local exclusive lock flag is "clear," i.e., indicating that an exclusive lock on the resource is not being held by any entity, then the entity seeking a shared lock acquires a shared lock without communication with the resource manager that manages access to the resource. However, if the local exclusive lock flag is "set," i.e., indicating that an exclusive lock is being held by some entity of the plurality of entities, then, in one embodiment, to determine whether the exclusive lock has been released, the entity seeking the shared lock keeps checking the local exclusive lock flag. When the exclusive lock is released, the local exclusive lock flag is "clear." Upon recognizing that the exclusive lock has been released, the entity seeking a shared lock acquires a shared lock.

In an alternative embodiment, when an exclusive lock is held by any entity of the plurality of entities, then the entity seeking the shared lock requests the resource manager for a shared lock. Upon receiving the request for a shared lock, the resource manager sends a message to the entity that is holding the exclusive lock. The message indicates that one entity of the plurality entities is waiting for a lock on the resource. The entity that is holding the exclusive lock, upon releasing the exclusive lock, notifies the resource manager that the exclusive lock has been released. The resource manager then relays the notification to the entity that was waiting for a shared lock so that that entity acquires a shared lock.

In one embodiment, when an entity seeks to acquire an exclusive lock, that entity requests the resource manager for an exclusive lock. If there is no conflict, then the resource manager grants an exclusive lock to the requesting entity. In this embodiment, no conflict exists when no other lock (e.g., neither a shared lock nor an exclusive lock) has been granted to any other entity. If a shared lock has been granted, then the resource manager sends a message to all entities that are holding a shared lock to notify those entities that another entity is waiting for an exclusive lock. Similarly, if an exclusive lock has been granted, then, the resource manager sends a message to the entity that is holding the exclusive lock to notify that entity that another entity is waiting for an exclusive lock. The entities that are holding either a shared lock or an exclusive lock, upon releasing their corresponding lock, notify the resource manager that the lock has been released. The resource manager then grants the entity seeking the exclusive lock an exclusive lock.

After the exclusive lock has been acquired by the requesting entity, the local exclusive lock flag of each entity of the plurality of entities is updated via a broadcast so that the data reflects that one entity of the plurality of entities is holding an exclusive lock. Similarly, when an exclusive lock is released, the same data is updated so that the data reflects that no entity of the plurality of entities is holding an exclusive lock. The cost of the broadcast outweighs the performance gain when acquiring the shared lock.

System Overview

Figure 2:
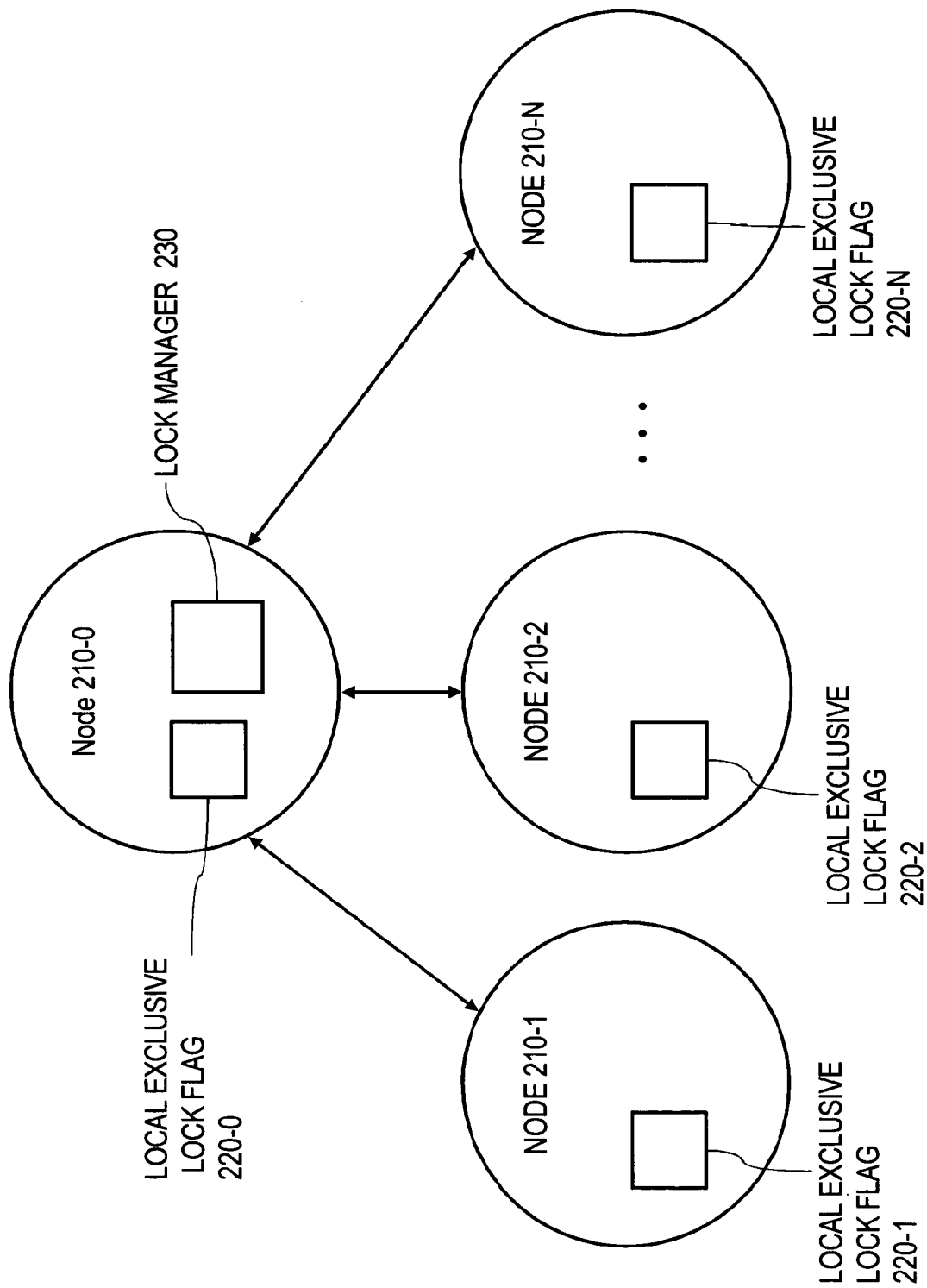
FIG. 2 is a block diagram showing a system in which a lock manager is assigned to a group of entities for managing resources that are accessible to those entities.

FIG. 2 shows a system 200 in which a lock manager 230 is assigned to a group of entities (i.e. the processes on nodes 210-O to 210-N). Lock manager 230 manages resources that are accessible to those entities, in accordance with one embodiment. The processes on nodes 210-O to 210-N have access to various resources in a computer network. In one embodiment, a lock manger 230 resides in a node 210, e.g., 210-O. For the purpose of explanation, a node is said to be seeking to obtain a lock when any process on the node is seeking to obtain a lock. Further a node seeking to obtain a lock is referred to as "node 210S".

While the techniques described herein will be described with reference to an embodiment in which the entities are processes executing on nodes within a network, the invention is not limited to nodes and/or resources in a computer network. The techniques described herein are applicable to any system in which entity that seeks access to a resource that is accessible to a plurality of entities.

Local Exclusive Lock Flags

Techniques are provided for granting shared locks to processes on nodes 210 more efficiently. In one embodiment, each node 210 has a local exclusive lock flag that is local to that node 210 in order to indicate whether an exclusive lock for a resource has been granted to any of the node 210 in the plurality of nodes 210-O to 210-N. In one embodiment, the local exclusive lock flag that is local to a node 210 is stored in that node 210, and is implemented as a variable. If all local exclusive lock flags 220 of all nodes 210 are "set" to "TRUE," then one node 210 of the plurality of nodes 210 is holding an exclusive lock. However, if all local exclusive lock flags 220 in all nodes 210 are "clear" or set to "FALSE," then no node 210 in the plurality of nodes 210 is holding an exclusive lock.

In one embodiment, if an exclusive lock is granted for a resource to any one node 210 of the plurality of nodes 210, then all local exclusive lock flags 220 for the resource in all nodes 210 are set. In contrast, if an exclusive lock is released by the node 210 that is holding the exclusive lock, all local exclusive lock flags 220 are cleared. It is noted here that even if all local exclusive lock flags 220 are clear, a shared lock may be held by one or more nodes 210 of the plurality of nodes 210.

Request for a Shared Lock

Figure 3:
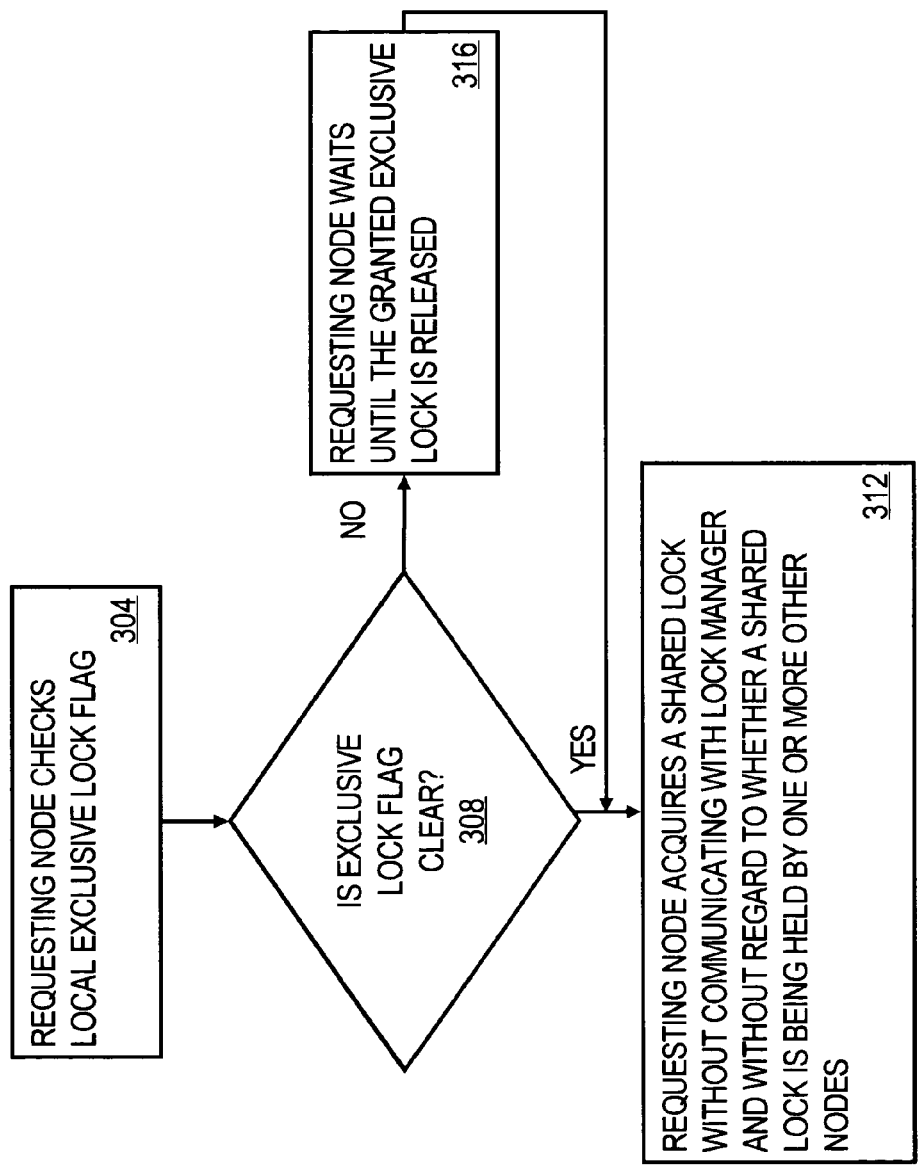
FIG. 3 is a flowchart illustrating steps performed by a node seeking to acquire a shared lock, according to an embodiment of the invention.

FIG. 3 is a flowchart illustrating one embodiment of the invention in which a requesting node 210S seeks to acquire a shared lock on a resource. In step 304, node 210S checks the local exclusive lock flag 220 that is associated with that node 210S. This local exclusive lock flag 220 that is associated with node 210S is herein referred to as local exclusive lock flag 220S.

In step 308, it is determined whether local exclusive lock flag 220S is clear or set. If local exclusive lock flag 220S is clear, which indicates that an exclusive clock has not been granted to any node 210 of the plurality of nodes 210, then requesting node 210S in step 312 immediately obtains a shared lock without communicating with lock manager 230 and without regard to whether a shared lock is being held by one or more nodes 210.

Because the requesting node 210S is not required to communicate with lock manager 230 to obtain a shared lock under these circumstances, this technique is much more efficient than the prior art approach that requires two messages to acquire the same shared lock: a request for a shared lock from node 210S to lock manager 230 and a reply to grant the lock from lock manager 230 to node 210S.

If, on the other hand, local exclusive lock flag 220S associated with requesting node 210S is set (or not clear), i.e., indicating that an exclusive lock has been granted to one node 210 of the plurality of nodes 210, then requesting node 210S cannot immediately grant itself a shared lock. This is because no node 210 of the plurality of nodes 210 may hold a lock (either a shared lock or an exclusive lock) at the same time in which another node 210 is holding an exclusive lock. Consequently, requesting node 210S in step 316 waits until the exclusive lock is released before requesting node 210S obtains a shared lock in step 312.

Figure 4:
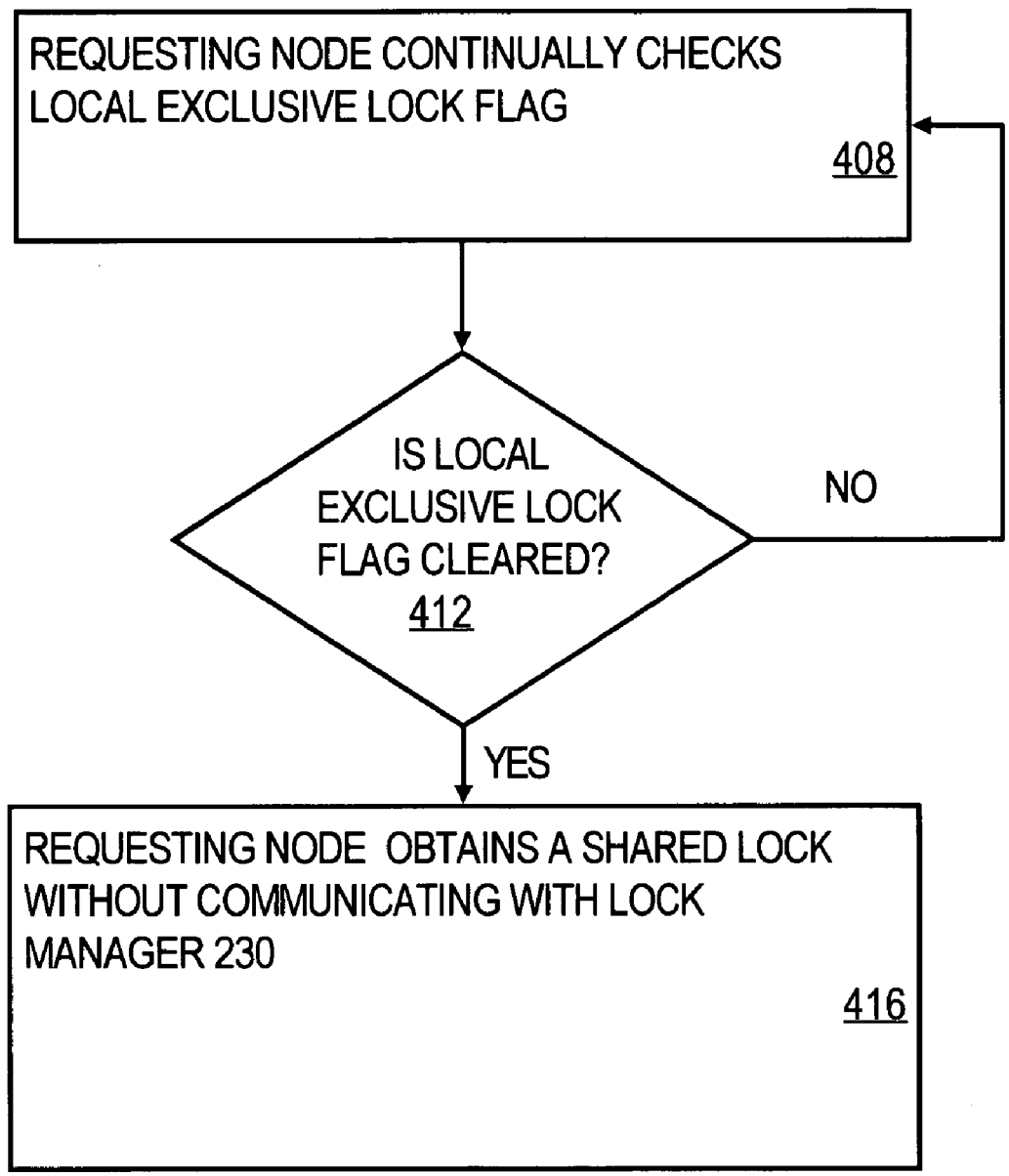
FIG. 4 is a flowchart illustrating actions involved in step 316 of FIG. 3 in greater detail, according to one embodiment of the invention.

FIG. 4 is a flowchart illustrating a first embodiment of step 316 of FIG. 3. In the embodiment shown in FIG. 4, the requesting node 210S in step 408 continually checks the local exclusive lock flag 220S while waiting for the exclusive lock to be released. It is determined in step 412 whether local exclusive lock flag 220S is cleared. In this example, a local exclusive lock flag 220S changing state from "set" to "clear" indicates that the exclusive lock has been released by the node 210 that had been holding the exclusive lock.

As local exclusive lock flag 220S is cleared, requesting node 210S in step 416 acquires a requested shared lock without communicating with lock manager 230. In one embodiment, the node 210 that is holding the exclusive lock notifies lock manager 230 when that node 210 releases the granted exclusive lock. Upon receiving a notification that the granted exclusive lock has been released, lock manager 230 clears all local exclusive lock flags 220 in all corresponding nodes 210. Various techniques may be used to clear the local exclusive lock flags, and the present invention is not limited to any such technique.

If, on the other hand, it is determined in step 412 that local exclusive lock flag 220S is not cleared, then node 210S in step 408 continually checks local exclusive lock flag 220S until local exclusive lock flag 220S is cleared, and node 210S in step 416 then obtains a shared lock when local exclusive lock flag 220S is cleared.

Figure 5:
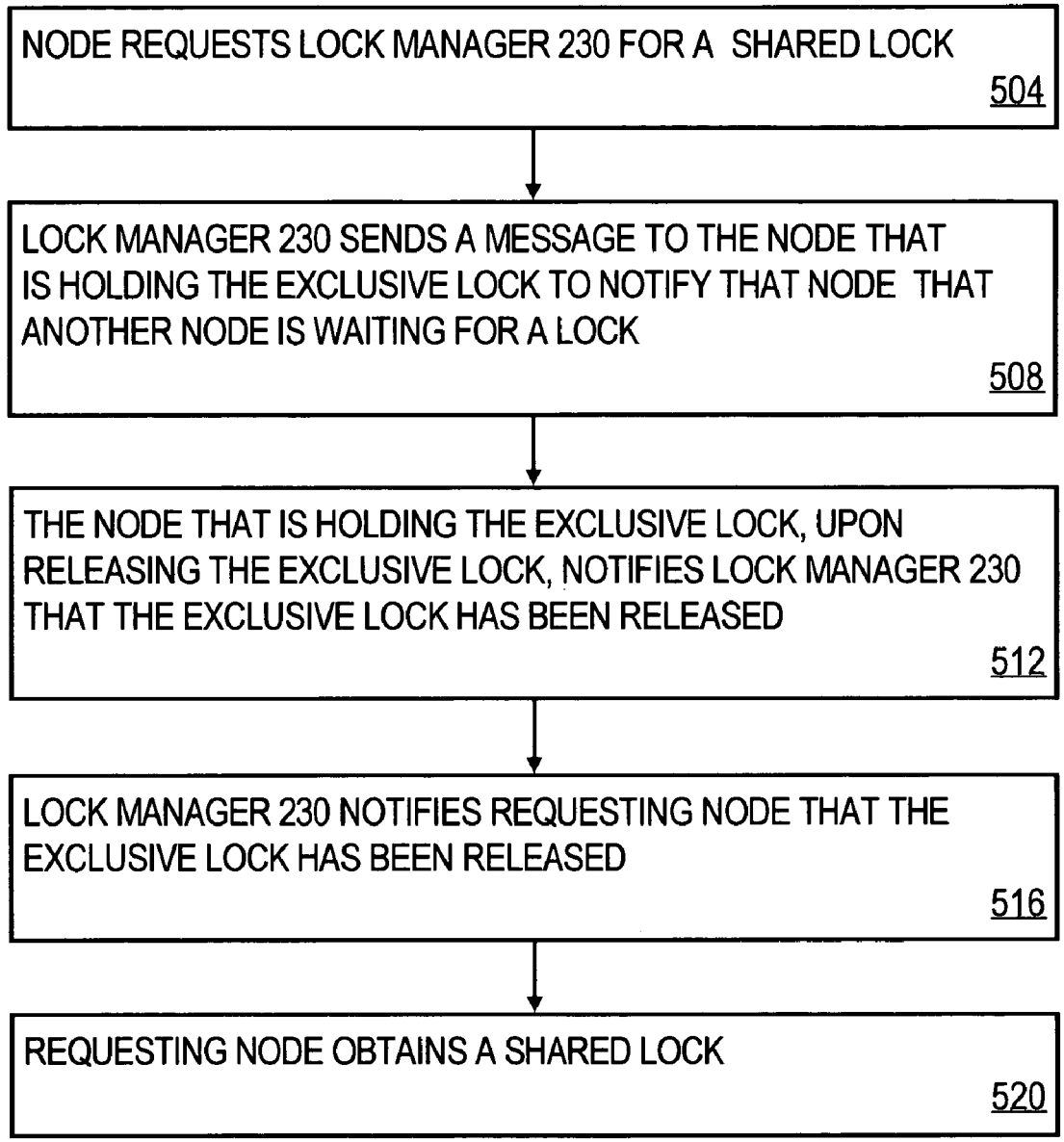
FIG. 5 is a flowchart illustrating actions involved in step 316 of FIG. 3 in greater detail, according to one embodiment of the invention.

FIG. 5 is a flowchart illustrating an alternative embodiment of step 316 of FIG. 3. In the embodiment illustrated in FIG. 5, the requesting node 210S in step 504, upon recognizing that it has to wait for the exclusive lock to be released, requests lock manager 230 for a shared lock. Upon receiving such a request, lock manager 230 in step 508 sends a message to the node 210 that is holding the exclusive lock to notify that node 210 that another node 210 is waiting for a lock.

Alternatively, lock manager 230 places the request of node 210S in a waiting queue, and processes the request as appropriate when the request arrives at the head of the waiting queue. The node 210 that is holding an exclusive lock may or may not immediately release the exclusive lock, based on various factors, including, for example, priorities of tasks. However, upon releasing the exclusive lock, the node 210 that is holding the exclusive lock in step 512 notifies lock manager 230 that the exclusive lock has been released. Lock manager 230 in step 516 in turn notifies requesting node 210S that has been waiting for the exclusive lock to be released that the exclusive lock has been released. The lock manager 230 may, at this point, also cause all of the local exclusive lock flags to be cleared. Upon recognizing that the exclusive lock has been released, requesting node 210S in step 520 obtains a shared lock.

Figure 6:
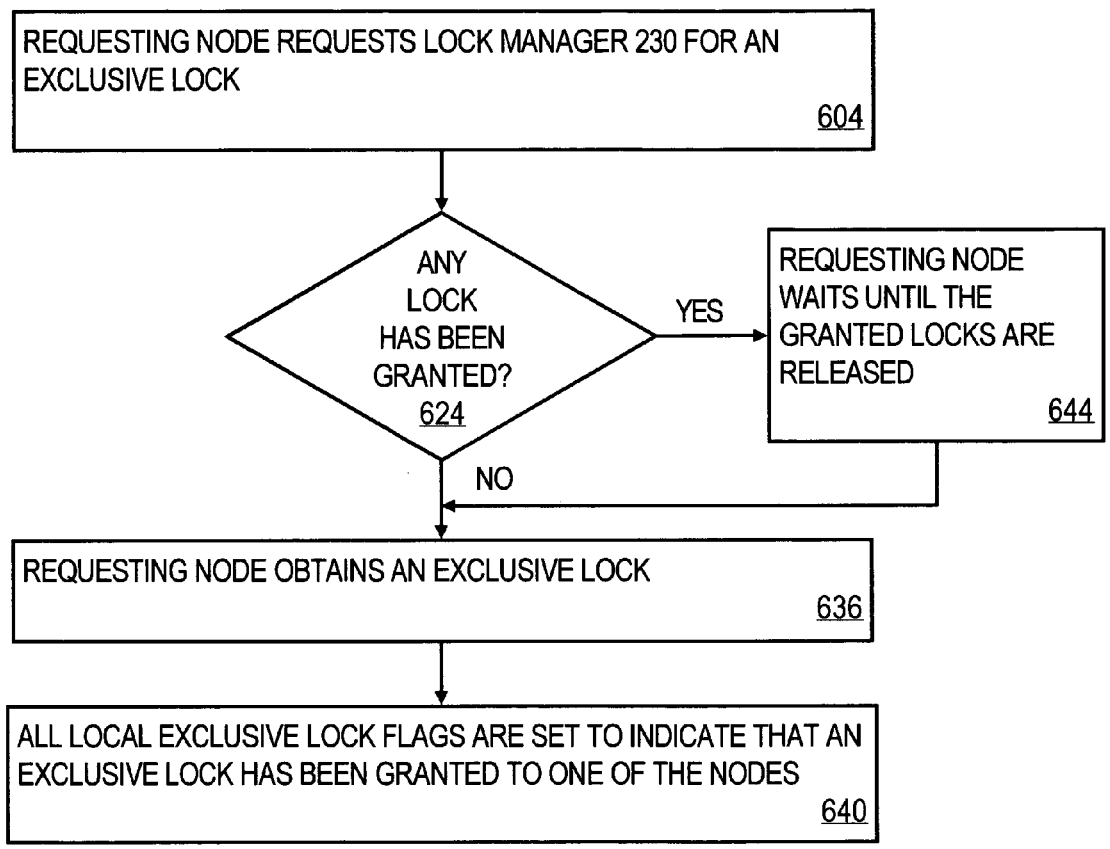
FIG. 6 is a flowchart illustrating how a node requests an exclusive lock, according to an embodiment of the invention.

FIG. 6 is a flowchart illustrating how a requesting node 210S requests an exclusive lock, in accordance with one embodiment. In step 604 requesting node 210S sends a message to lock manager 230 to request lock manager 630 for an exclusive lock. Depending on various embodiment of the invention, the request may be placed in a waiting queue to be processed appropriately. In one embodiment, the request is placed at the end of the waiting queue and is processed only when the request reaches the beginning of the waiting queue.

In step 624 it is determined whether any lock (either an exclusive lock or a shared lock) has been granted to any one node 210 of the plurality of nodes 210. In one embodiment, lock manager 230 maintains a "grant queue" to keep track of the list of locks and the list of corresponding nodes to which the locks are granted. Lock manager 230 then checks this grant queue to determine whether a lock has been granted to any node 210.

If no lock has been granted to any one node 210 of the plurality of nodes 210, then requesting node 210S in step 636 obtains an exclusive lock, and in step 640 all local exclusive lock flags 220 are set to indicate that a node 210 in the plurality of nodes 210 is holding an exclusive lock. In one embodiment, lock manager 230 broadcast messages to all nodes 210 for all nodes 210 to set their corresponding local exclusive lock flags 220.

However, if it is determined in step 624 that at least one lock has been granted to any node 210 of the plurality of nodes 210, then requesting node 210S waits for all granted lock(s) to be released by the node(s) that is holding the granted lock before obtaining the exclusive lock in step 640. Requesting node 210S has to wait for all granted locks to be released before obtaining the exclusive lock because a node 210 can not hold an exclusive lock while another node 210 is holding either a shared lock or an exclusive lock.

In one embodiment, lock manager 230 transmits messages to the nodes 210 that are holding locks to notify the nodes that another node 210 is waiting for an exclusive lock so that the nodes 210 that are holding the locks can accordingly release the lock in due time. The nodes 210 that are holding locks, upon releasing the corresponding locks, notify lock manager 230 that the corresponding locks have been released. Lock manager 230 then notifies requesting node 210S that the granted lock has been released for requesting node 210S to obtain the requested exclusive lock.

Hardware Overview

Figure 7:
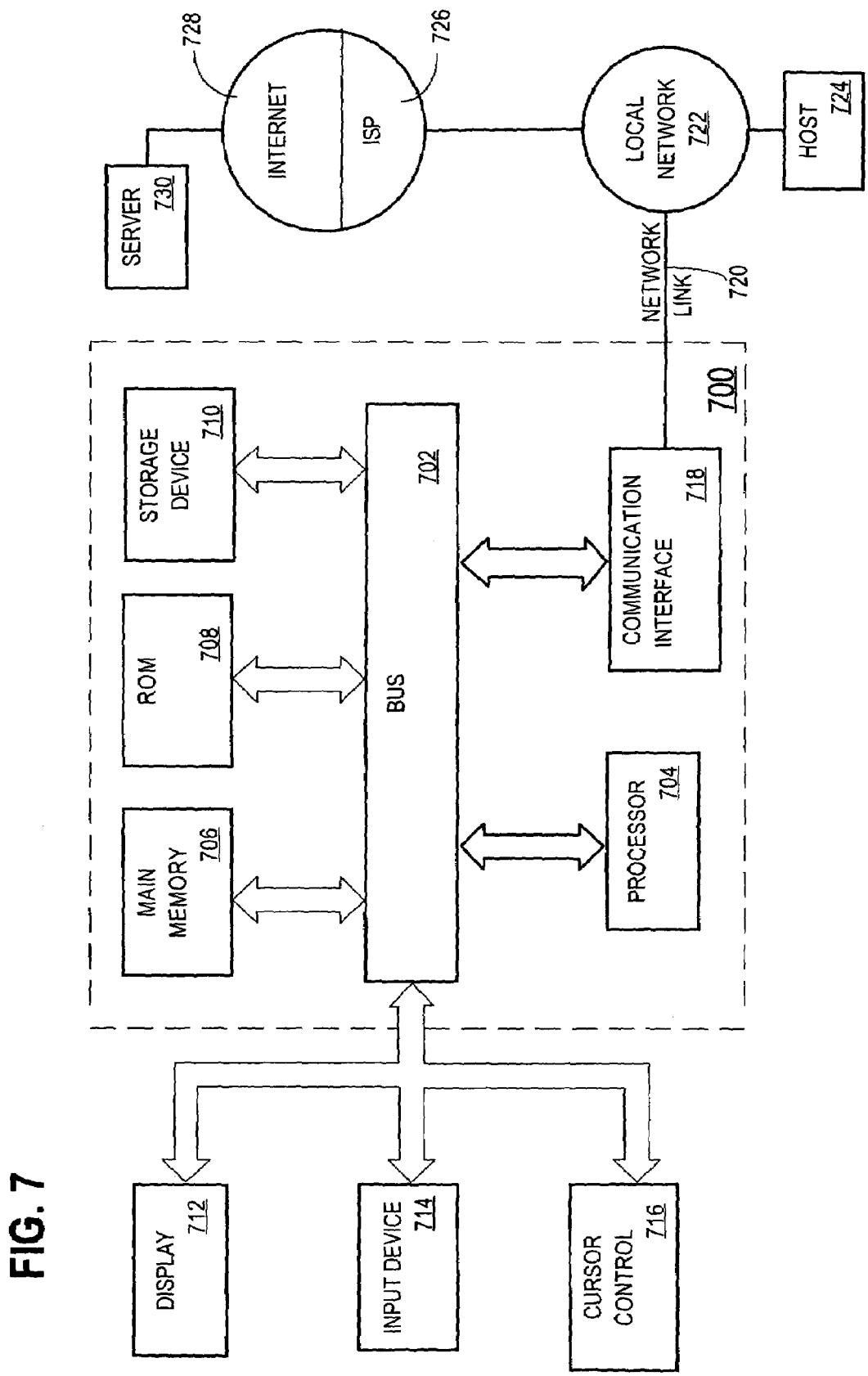
FIG. 7 is a block diagram of a computer system on which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for managing access to a resource that is accessible to a plurality of entities, the method comprising the steps of:
   for each entity of said plurality of entities, maintaining, local to said entity, data that indicates whether any other entity of said plurality of entities has an exclusive lock on said resource;
   for each entity of said plurality of entities that seeks to acquire a shared lock on said resource, performing the steps of:
      checking the data that is local to the entity;
      if the data indicates that an exclusive lock has not been granted to any of the other entities of said plurality of entities, then the entity acquiring said shared lock without receiving a lock grant from a resource master of said resource; and
      if the data indicates that an exclusive lock has been granted to any of the other entities of the plurality of entities, then the entity acquiring said shared lock only after said exclusive lock is released by the entity that has been holding said exclusive lock.

2. The method of claim 1 wherein the entity acquires said shared lock without communication with the resource master of the resource.

3. The method of claim 1 wherein the step of the entity acquiring said shared lock only after the exclusive lock is released is performed by the step of repeatedly checking the data that is local to the entity until that data indicates that the exclusive lock has been released by the entity that has been holding the exclusive lock.

4. The method of claim 1 wherein the step of the entity acquiring said shared lock only after the exclusive lock is released is performed after a step of receiving a message from the resource master notifying that the entity is allowed to acquire said shared lock.

5. The method of claim 1, upon the exclusive lock being released by the entity that has been holding the exclusive lock, performing the step of updating each data of the plurality of entities to reflect that none of the plurality of entities is holding an exclusive lock.

6. The method of claim 5 wherein the step of updating is initiated by the resource master that broadcasts messages to the plurality of entities for each entity of the plurality of entities to modify the data corresponding to the each entity.

7. The method of claim 1 wherein an entity of said plurality of entities is a database server.

8. A computer-implemented method for managing access to a resource that is accessible to a plurality of entities, the method comprising the steps of:
   for each entity of said plurality of entities, maintaining, local to said entity, data that indicates whether any other entity of said plurality of entities has an exclusive lock on said resource;
   for each entity of the plurality of entities that seeks to acquire an exclusive lock on said resource, performing the steps of:
      requesting, from a resource manager, said exclusive lock for said entity; wherein said resource manager manages access to said resource;
      if no conflicting lock is being held by any other entity of the plurality of entities, then
         said entity acquiring said exclusive lock, and
         updating the data of the plurality of entities to reflect that an exclusive lock is being held by one of the plurality of entities.

9. The method of claim 8 wherein, upon recognizing that no conflicting lock is being held by any of the entity of the plurality of entities, then the resource manager allowing the entity that seeks to acquire an exclusive lock to acquire that exclusive lock.

10. The method of claim 8, wherein, if an exclusive lock is being held by any entity of the plurality of entities, then indicating to the entity that is holding said exclusive lock that another entity of the plurality of entities is waiting for a lock.

11. The method of claim 10, wherein, upon said exclusive lock is being released by the entity that is holding said exclusive lock, indicating to the resource manager that said exclusive lock has been released by the entity that is holding said exclusive lock.

12. The method of claim 8, wherein, if a shared lock is being held by any entity of the plurality of entities, then indicating to all entities that are holding a shared lock that an entity of the plurality of entities is waiting for an exclusive lock.

13. The method of claim 12 wherein each entity of all entities that is are holding a shared lock, upon releasing said shared lock, indicates to said resource manager that the corresponding shared lock that is held by that entity has been released.

14. The method of claim 8 wherein an entity of the plurality of entities is a database server.

15. A computer-readable medium storing instructions for managing access to a resource that is accessible to a plurality of entities, the instructions including instructions for performing the steps of:
   for each entity of said plurality of entities, maintaining, local to said entity, data that indicates whether any other entity of said plurality of entities has an exclusive lock on said resource;

for each entity of said plurality of entities that seeks to acquire a shared lock on said resource, performing the steps of:

checking the data that is local to the entity;

if the data indicates that an exclusive lock has not been granted to any of the other entities of said plurality of entities, then the entity acquiring said shared lock without receiving a lock grant from a resource master of said resource; and if the data indicates that an exclusive lock has been granted to any of the other entities of the plurality of entities, then the entity acquiring said shared lock only after said exclusive lock is released by the entity that has been holding said exclusive lock.

16. The computer-readable medium of claim 15 wherein the entity acquires said shared lock without communication with the resource master of the resource.

17. The computer-readable medium of claim 15 wherein the step of the entity acquiring said shared lock only after the exclusive lock is released is performed by the step of repeatedly checking the data that is local to the entity until that data indicates that the exclusive lock has been released by the entity that has been holding the exclusive lock.

18. The computer-readable medium of claim 15 wherein the step of the entity acquiring said shared lock only after the exclusive lock is released is performed after a step of receiving a message from the resource master notifying that the entity is allowed to acquire said shared lock.

19. The computer-readable medium of claim 15 further including instructions for updating, in response to the exclusive lock being released by the entity that has been holding the exclusive lock, each data of the plurality of entities to reflect that none of the plurality of entities is holding an exclusive lock.

20. The computer-readable medium of claim 19 wherein the step of updating is initiated by the resource master that broadcasts messages to the plurality of entities for each entity of the plurality of entities to modify the data corresponding to the each entity.

21. The computer-readable medium of claim 15 wherein an entity of said plurality of entities is a database server.

22. A computer-readable medium storing instructions for managing access to a resource that is accessible to a plurality of entities, the instructions including instructions for performing the steps of:

for each entity of said plurality of entities, maintaining, local to said entity, data that indicates whether any other entity of said plurality of entities has an exclusive lock on said resource;

for each entity of the plurality of entities that seeks to acquire an exclusive lock on said resource, performing the steps of:

requesting, from a resource manager, said exclusive lock for said entity; wherein said resource manager manages access to said resource;

if no conflicting lock is being held by any other entity of the plurality of entities, then said entity acquiring said exclusive lock, and updating the data of the plurality of entities to reflect that an exclusive lock is being held by one of the plurality of entities.

23. The computer-readable medium of claim 22 storing instructions to cause the resource manager to allow the entity that seeks to acquire an exclusive lock to acquire that exclusive lock if no conflicting lock is being held by any of the entity of the plurality of entities.

24. The computer-readable medium of claim 22, storing instructions for indicating to the entity that is holding said exclusive lock that another entity of the plurality of entities is waiting for a lock when an exclusive lock is being held by any entity of the plurality of entities.

25. The computer-readable medium of claim 22, storing instructions for indicating to all entities that are holding a shared lock that an entity of the plurality of entities is waiting for a lock if a shared lock is being held by any entity of the plurality of entities.

26. The computer-readable medium of claim 22 storing instructions for causing each entity of all entities that are holding a shared lock, upon releasing said shared lock, to indicate to said resource manager that the corresponding shared lock that is held by that entity has been released.

\* \* \* \* \*

UNITED STATES PATENT AND TRADEMARK OFFICE
CERTIFICATE OF CORRECTION

PATENT NO. : 6,965,893 B1
DATED : November 15, 2005
INVENTOR(S) : Wilson Wai Shun Chan et al.

It is certified that error appears in the above-identified patent and that said Letters Patent is hereby corrected as shown below:

<u>Column 10,</u>
Line 53, delete "that is are" and insert -- that are --.

Signed and Sealed this

Twenty-fourth Day of January, 2006

JON W. DUDAS
*Director of the United States Patent and Trademark Office*